(12) United States Patent
Lee et al.

(10) Patent No.: US 7,849,355 B2
(45) Date of Patent: Dec. 7, 2010

(54) DISTRIBUTED OBJECT SHARING SYSTEM AND METHOD THEREOF

(75) Inventors: Sang Min Lee, Daejeon (KR); June Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 410 days.

(21) Appl. No.: 11/948,918

(22) Filed: Nov. 30, 2007

(65) Prior Publication Data

US 2008/0133967 A1 Jun. 5, 2008

(30) Foreign Application Priority Data

Dec. 1, 2006 (KR) ............... 10-2006-0120345
Aug. 16, 2007 (KR) ............... 10-2007-0082155

(51) Int. Cl.
*G06F 11/00* (2006.01)
(52) U.S. Cl. ............................................. 714/6
(58) Field of Classification Search ............ 714/6
See application file for complete search history.

(56) References Cited

U.S. PATENT DOCUMENTS

| | | | |
|---|---|---|---|
| 7,383,406 B2 * | 6/2008 | McBride et al. | 711/162 |
| 7,536,586 B2 * | 5/2009 | Ahmadian et al. | 714/6 |
| 2003/0167439 A1 * | 9/2003 | Talagala et al. | 714/770 |
| 2006/0036891 A1 | 2/2006 | Halevy | |
| 2006/0156059 A1 | 7/2006 | Kitamura | |

FOREIGN PATENT DOCUMENTS

| | | |
|---|---|---|
| JP | 2004-062376 A | 2/2004 |
| KR | 20060067119 | 6/2006 |
| WO | WO-02/069162 | 9/2002 |

\* cited by examiner

*Primary Examiner*—Bryce P Bonzo
(74) *Attorney, Agent, or Firm*—Rabin & Berdo, P.C.

(57) ABSTRACT

A distributed object sharing system and a method thereof are provided. In a file server writing method for storing an object in a RAID (redundant array of inexpensive disks) apparatus having a plurality of storage apparatuses, the file server writing method includes: a first process of, when an object writing command for a specific object is generated during error recovery in an erroneous storage apparatus, checking a recovery state of the object with reference to recovery state information provided from a metadata server; a second process of, when the recovery of the object is completed, performing the object writing command on a normal storage apparatus and a recovery storage apparatus; a third process of, when the recovery of the object is proceeding, receiving the recovery state information from the metadata server again, checking the recovery state of the object again, and determining whether or not to perform the second process; a fourth process of, when the second process is determined not to performed, performing the object writing command on only the normal storage apparatus and receiving the recovery state information from the metadata server again; and a fifth process of checking the recovery state of the object with reference to the received recovery state information and, when the recovery of the object is completed, additionally performing the object writing command on the recovery storage apparatus. Accordingly, it is possible to prevent data loss and perform I/O command during error recovery.

22 Claims, 9 Drawing Sheets

DISTRIBUTED OBJECT SHARING SYSTEM AND METHOD THEREOF

CROSS-REFERENCE TO RELATED APPLICATIONS

This application claims the priorities of Korean Patent Application No. 10-2006-0120345 filed on Dec. 1, 2006, and No. 10-2007-0082155 Aug. 16, 2007, in the Korean Intellectual Property Office, the disclosure of which is incorporated herein by reference.

BACKGROUND OF THE INVENTION

1. Field of the Invention

The present invention relates to a RAID (redundant array of inexpensive disks) apparatus in a distributed object sharing system, and more particularly, to a distributed object sharing system capable of preventing data loss during error recovery in the system and a method thereof. This work was supported by the IT R&D program of MIC/IITA [Project No. 2005-S-405-02, Project Name: A Development of the Next Generation Internet Server Technology].

2. Description of the Related Art

In general, a distributed object sharing system constructed with a plurality of original storage apparatuses includes a RAID apparatus having an error recovery function in consideration of system availability and a system performance. The RAID apparatus is implemented in a mirroring scheme or a striping scheme.

In the mirroring scheme, one or more copies of data for an original data are generated, and the copies of the data are stored in different storage apparatuses. An RAID apparatus using the mirroring scheme is referred to as RAID Level 1. In the mirroring scheme, a storage space is wasted, and a time for a wiring operation is long. However, in a case where multiple reading requests for the same data are generated simultaneously, the reading operations can be distributed over a plurality of storage apparatuses. Even in a case where errors as many as the number of copies of the data occur, the system can be operated consistently.

In the stripping scheme, data is divided in unit of a predetermined size, and divided data sections are distributed and stored in a plurality of storage apparatuses. An RAID apparatus using the stripping scheme is referred to as RAID Level 5. In the stripping scheme, in a case where an input/output (I/O) size of data is small, a parallel process can be performed over the different storage apparatuses. In addition, in a case where the I/O size is large, a simultaneous reading operation can be performed on the storage apparatuses. In addition, a parity, that is, a kind of redundant information is used, so that the system can be consistently operated in occurrence of one error. However, since the parity needs to be updated at every time of updating the data, an overhead may be added to a wiring performance.

The distributed object sharing system has a centralized structure in that a metadata is managed by a metadata server and a plurality of file server are operated based on metadata information received from the metadata server.

In the centralized structure, the metadata server using Level-1 or Level-5 RAID apparatus exclusively recovers errors of the RAID apparatus. In this case, data loss may occur.

FIG. 1 is a block diagram illustrating a configuration of a conventional distributed object sharing system using a Level-1 RAID apparatus.

Referring to FIG. 1, the distributed object sharing system includes a metadata server 110 having a RAID error recovery unit 111 for recovering an error of a RAID apparatus 130, at least one file server 120 having a RAID driving unit 121 for performing reading and writing commands for an object by using the RAID apparatus 130, an original storage apparatus 131 for storing an original data, a storage apparatus 132 for storing a copy of the data, and the RAID apparatus having a recovery storage apparatus 133 for storing a data recovered by the RAID error recovery unit 111.

When the file server 120 generates an object generating command, the original storage apparatus 131 of the RAID apparatus 130 generates the corresponding object and transmits the object generating command including an identifier of the object to the copy storage apparatus 132. In response to the object generating command, the copy storage apparatus 132 generates the same object.

As a result, the original storage apparatus 131 and the copy storage apparatus 132 can generate the object having the same identifier. Namely, in the original storage apparatus 131 and the copy storage apparatus 132, the same object A, object B, and object C exist.

In case of Level-1 RAID apparatus 130, the writing command are performed on all the storage apparatuses 131 and 132, but the reading command are performed one storage apparatus 131 among all the storage apparatus.

For example, in case of multiple file servers, when a file server 1 intends to update contents of an object A, the same writing command is transmitted to the objects A of the original storage apparatus 131 and the copy storage apparatus 132.

However, when a file server 2 intends to read contents of an object B and a file server 3 intends to read contents of an object C, the file server 2 reads the contents of the object B from the original storage apparatus 131, and the file server 3 reads the contents from the copy storage apparatus 132.

Namely, the reading command can be subject to a load distribution process. In this case, it is determined by using an I/O distribution algorithm whether or not to read the contents of the object from the storage apparatus.

FIG. 2 is a block diagram for explaining an error recovery method in the distributed object sharing system of FIG. 1.

When an error occurs in the copy storage apparatus 132, the RAID error recovery unit 111 of the metadata server 110 forcibly generates an error in the copy storage apparatus 132. Next, all the objects stored in the copy storage apparatus 132 are sequentially read out (S11), and the objects are sequentially stored in the recovery storage apparatus 133 to recover the error (S12).

During these operations, when the file server 120 generates an update command for the recovery-proceeding object (S13), data loss occurs.

Namely, when a recovery command for the object B and an update command for the object B are generated simultaneously, the metadata server 110 performs firstly the reading operation on the object B and secondly the writing operation on the object B. On the contrary, the file server 120 performs only the writing operation on the object B.

The original storage apparatus 131 performs firstly the reading command of the metadata server 110 and secondly the update command of the file server 120. The recovery storage apparatus 133 performs firstly the update command of the file server 120 and secondly the reading command of the metadata server 110.

Therefore, a non-updated object other than the updated object which is updated by the metadata server 1100 is stored in the recovery storage apparatus 133, so that different objects are stored in the original storage apparatus 131 and the recovery storage apparatus 133. As a result, data loss occurs in the recovery storage apparatus 133.

FIG. 3 is a block diagram illustrating a configuration of a conventional distributed object sharing system using a Level-5 RAID apparatus.

Referring to FIG. 3, similar to FIG. 1, the distributed object sharing system includes a metadata server 210, at least one file server 220, and a RAID apparatus 230. The RAID apparatus 230 includes a plurality of storage apparatuses 231 to 234 for storing data of objects in a distributed manner and a recovery storage apparatus 235 for storing a data of an object which is recovered by the RAID error recovery unit 211 of the file server 220.

The number of tolerable errors of the RAID apparatus 230 is determined based on the number of parity information. However, since the parity information needs to be synchronized with data updating, an overhead may be added to a writing performance.

For example, when the file server 220 intends to update a data 5 of an object A, a data as much as the to-be-updated data 5 is read out from the object A of the storage apparatus 231 in which the data 5 is stored.

Next, parity information corresponding to the same offset and the same size is readout from a parity 1 of the object A of the storage apparatus_3 233 which stores parity information of a stripe 1 which the data 5 belongs to.

Next, new parity information is calculated by performing an exclusive-OR operation on a written data, a parity, and a new data in units of a bit.

The writing commands for the new parity information and the new data 5 are transmitted to the storage apparatuses 231 to 234, so that the writing commands are performed.

More specifically, in order to perform the writing command, a total of four input and output operations, that is, two input and output operations for the reading command and two input and output operations for the writing command are performed.

FIG. 4 is a block diagram for explaining an error recovery method in the distributed object sharing system of FIG. 3.

When the metadata server 210 detects an occurrence of an error in the storage apparatus_2 232, the RAID error recovery unit 211 of the metadata server 210 sequentially recovers the objects of the storage apparatus_2 232 to the recovery storage apparatus 235 in units of a stripe in the order of object identifiers.

Namely, the RAID error recovery unit 211 stores the objects of the original storage apparatus_2 232 in the recovery storage apparatus 235 in the order of the stripes 0, 1, and 2 of the object A of the original storage apparatus_2 232 and in the order of the stripes 0, 1, and 2 of the object B of the original storage apparatus_2 232.

However, if the file server 220 generates the update command for the recovery-proceeding object in this state, the data loss occurs.

Now, the recovery of the stripe 1 of the object A that is performed by the metadata server 210 during the update operation on the data 5 of the object A that is performed by the file server 220 is described with reference to FIG. 4.

The file server 220 reads out a data 5, a data 3, and a data 4 for party update (S21, S22, and S23). The file server 220 recovers the parity 1 (S24). After that, the file server 220 calculates a new parity 1 (S25).

At the same time, the metadata server 220 also reads out the data 5, the data 3, and the data 4 for the recovery of the parity 1 of the object A (S26, S27, and S28). The metadata server 220 recovers the parity 1.

When completing the parity update, the file server 220 stores a new data 5 in the storage apparatus_1 231 (S29). The file server 220 stores a new parity 1 in the recovery storage apparatus 235 (S30). On the other hand, when completing the recovery of the parity 1, the metadata server 210 stores the recovered parity 1 in the recovery storage apparatus 235 (S31).

In this manner, if the metadata server 210 performs the recovery operation of the parity 1 after the file server 230 performs the writing operation of the parity 1, a non-updated parity 1 other than the updated parity 1 is stored in the recovery storage apparatus 235.

In the conventional distributed object sharing system, after the recovery is completed or when the recovery is performed due to an erroneous storage apparatus, the recovery may be performed with an erroneous data, and data loss may occur. Namely, the conventional distributed object sharing system has a problem in that the data loss may occur during the error recovery of the RAID apparatus.

SUMMARY OF THE INVENTION

An aspect of the present invention provides a distributed object sharing system capable of preventing data loss during error recovery in the system and a method thereof.

According to an aspect of the present invention, there is provided a file server writing method of a file server storing an object in a RAID (redundant array of inexpensive disks) apparatus having a plurality of storage apparatuses, the file server writing method comprising: a first process of, when an object writing command for a specific object is generated during error recovery in an erroneous storage apparatus, checking a recovery state of the object with reference to recovery state information provided from a metadata server; a second process of, when the recovery of the object is completed, performing the object writing command on a normal storage apparatus and a recovery storage apparatus; a third process of, when the recovery of the object is proceeding, receiving the recovery state information from the metadata server again, checking the recovery state of the object again, and determining whether or not to perform the second process; a fourth process of, when the second process is determined not to performed, performing the object writing command on only the normal storage apparatus and receiving the recovery state information from the metadata server again; and a fifth process of checking the recovery state of the object with reference to the re-received recovery state information and, when the recovery of the object is completed, additionally performing the object writing command on the recovery storage apparatus.

In the above aspect of the present invention, the recovery state information may include a calculation mode flag, a first identifier of the recovery-proceeding object, and a first logic offset of the recovery-completed object used to determine storage apparatuses on which the command is to be performed.

In addition, the first process may comprise: determining that the recovery of the erroneous storage apparatus is completed when the first identifier is a recovery-completed value and when an identifier of the object is smaller than or equal to the first identifier firstly generated after the start of the recovery; determining that the recovery of the object is completed when the identifier of the object is smaller than the first identifier; determining that the recovery of the object is proceeding when the identifier of the object is equal to the first identifier; determining that the recovery of the object is completed up to an object data corresponding to a logic offset when the identifier of the object is equal to the first identifier and when the logic offset corresponding to the object data is smaller than a first logic offset; and determining that the recovery of the object does not start when the first identifier is an initial value.

In addition, the third process may comprise: when the recovery of the object is proceeding, receiving the recovery state information from the metadata server; and when the calculation mode flag of the recovery state information is the second value, performing the second process and, when the calculation mode flag of the recovery state information is the first value, activating a re-verification flag.

In addition, the fourth process may comprise: when the re-verification flag is activated, performing the writing command on only the normal storage apparatus; and receiving the recovery state information from the metadata server again.

In addition, the fifth process may comprise: when the calculation mode flag of the re-received recovery state information is the second value, additionally performing the object writing command on the recovery storage apparatus; and when the calculation mode flag of the re-received recovery state information is the first value, determining that the recovery of the object is proceeding.

According to another aspect of the present invention, there is provided a file server reading method of a file server storing an object in a RAID (redundant array of independent disks) apparatus having a plurality of storage apparatuses, the file server reading method comprising: a first process of, when an object reading command for a specific object is generated during error recovery in an erroneous storage apparatus, checking a recovery state of the object with reference to recovery state information provided from a metadata server; a second process of, when the recovery of the object is completed, performing the object reading command on a normal storage apparatus and a recovery storage apparatus; a third process of, when the recovery of the object is proceeding or does not start, performing the object reading command on only the normal storage apparatus.

In the above aspect of the present invention, the recovery state information may include a calculation mode flag, a first identifier of the recovery-proceeding object, and a first logic offset of the recovery-completed object used to determine storage apparatuses on which the command is to be performed.

In addition, the first process may comprise: determining that the recovery of the erroneous storage apparatus is completed when the first identifier is a recovery-completed value and when an identifier of the object is smaller than or equal to the first identifier firstly generated after the start of the recovery; determining that the recovery of the object is completed when the identifier of the object is smaller than the first identifier; determining that the recovery of the object is proceeding when the identifier of the object is equal to the first identifier; determining that the recovery of the object is completed up to an object data corresponding to a logic offset when the identifier of the object is equal to the first identifier and when the logic offset corresponding to the object data is smaller than a first logic offset; and determining that the recovery of the object is not completed when the first identifier is an initial value.

According to still another aspect of the present invention, there is provided a metadata server error-recovering method of recovering an error of a RAID apparatus having a plurality of storage apparatuses, the metadata server error-recovering method comprising: a first process of, when an erroneous storage apparatus is detected, determining a to-be-recovered object, reading the object from a normal storage apparatus, storing the object in a recovery storage apparatus, and acquiring recovery information; and a second process of, when a recovery state information request is inputted from a file server, determining a calculation mode according to an operation state of the file server and providing the calculation mode and the recovery information to the file server.

In the above aspect, the first process may comprise: when the erroneous storage apparatus is detected, reading object list information and object information from the normal storage apparatus and storing the object list information and the object information; determining the to-be-recovered object with reference to the object information and acquiring an identifier of a recovery-proceeding-object and a last to-be-recovered logic offset corresponding to the to-be-recovered object; reading the to-be-recovered object in units of a logic offset from the normal storage apparatus, storing the to-be-recovered object in the recovery storage apparatus, and acquiring the logic offset of the to-be-recovered object stored in the recovery storage apparatus as a recovery-completed logic offset; and generating the recovery information including the identifier of the recovery-proceeding object, the last to-be-recovered logic offset, and the recovery-completed logic offset.

In addition, the second process comprises: receiving a request message including an identifier of the file server, the identifier of the object, the logic offset of the object data, and a command type from the file server; when the identifier of the recovery-proceeding object is an initial value, setting the calculation mode to a first state; when the identifier of the recovery-proceeding object is not generated or when the identifier of the recovery-proceeding object is larger than the identifier of the object, setting the calculation mode to a second state; when the identifier of the recovery-proceeding object is smaller than or equal to the identifier of the object and when the logic offset of the object data is larger than the recovery-completed logic offsets, setting the calculation mode to the second state; when the identifier of the recovery-proceeding object is larger than the identifier of the object and when the command type is not a writing command, setting the calculation mode to the first state; when the command type is the writing command and when the logic offset of the object data is larger than the last to-be-recovered logic offset, setting the calculation mode to the first state; and generating a response message including the calculation mode, the identifier of the recovery-proceeding object, the recovery-completed logic offset, and the last to-be-recovered logic offset and transmitting the response message to the file server.

According to further still another aspect of the present invention, there is provided a file server storing an object in a RAID apparatus having a plurality of storage apparatuses, the file server comprising: a recovery state storage unit storing recovery state information provided from a metadata server; a RAID driving unit, when a writing or reading command is requested in occurrence of an erroneous storage apparatus, performing the writing or reading command while checking a recovery state of the erroneous storage apparatus with reference to the recovery state information; and a recovery state checking unit requesting the recovery state information to the metadata server and receives the recovery state information from the metadata server.

In the above aspect of the present invention, when the recovery of the object is completed as a result of analysis of the recovery state information, the RAID driving unit may perform the command on the normal storage apparatus and the recovery storage apparatus, and when the recovery of the object does not start, the RAID driving unit may perform the command on the normal storage apparatus. In addition, when the recovery of the object is proceeding in generation of the writing command, the RAID driving unit may firstly perform the writing command on the normal storage apparatus, receive the recovery state information from the metadata server again to determine whether or not the recovery of the object is completed, and determine whether or not to perform the writing command on the recovery storage apparatus.

According to further still another aspect of the present invention, there is provided a metadata server for recovering an error of a RAID apparatus having a plurality of storage apparatuses, the metadata server comprising: a RAID error recovery unit, when an erroneous storage apparatus occurs, acquiring recovery information while recovering an object stored in the RAID apparatus to a recovery storage apparatus; a recovery information storage unit storing the recovery information; and a recovery state reporting unit, when a recovery state information request is input from a file server, determining a calculation mode according to an operation state of the file server, generates the recovery state information including the calculation mode and the recovery information, and providing the recovery state information to the file server.

In the above aspect of the present invention, the recovery state reporting unit may analyze a request message including an identifier of the file server, an identifier of the object, a logic offset of an object data, and a command type from the file server, set the calculation mode flag to determine the storage apparatuses on which the command is performed, and provide the calculation mode flag and the recovery information to the file server.

In the distributed object sharing system and the method thereof according to the present invention, the file server performs I/O command while checking the recovery state of the metadata server.

Therefore, only after the recovery of the object of the RAID apparatus or the data of the object is completed, the to-be-updated object or the data of the to-be-updated object are stored. Accordingly, the data loss during the error recovery of the RAID apparatus can be prevented.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
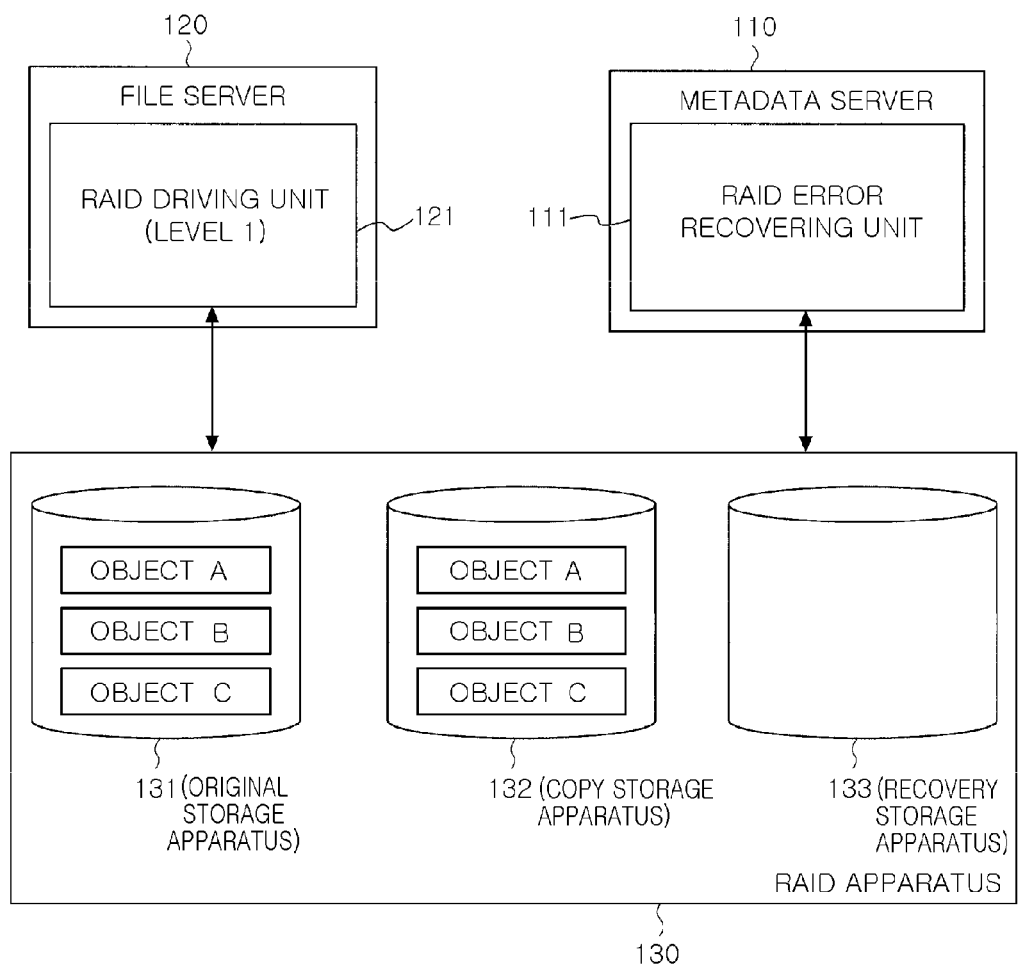
FIG. 1 is a block diagram illustrating a configuration of a conventional distributed object sharing system using a Level-1 RAID apparatus.
Figure 2:
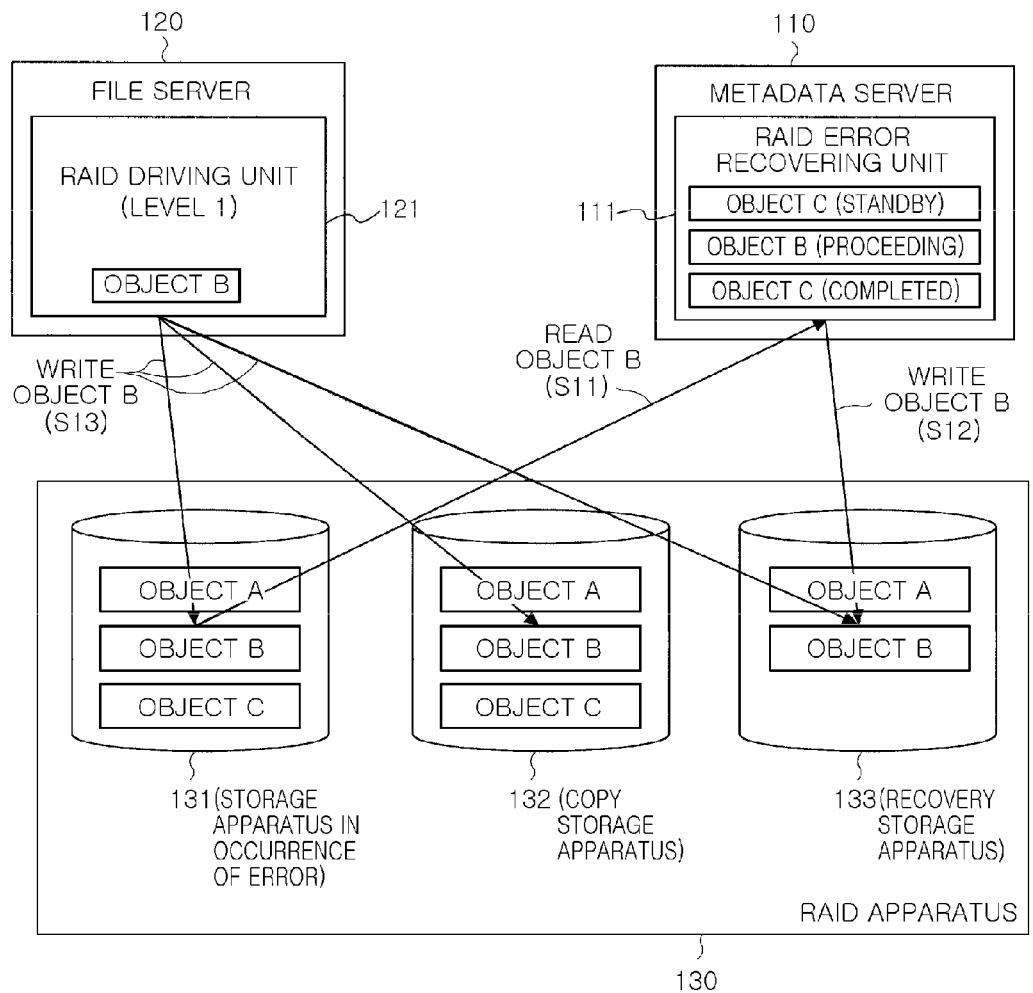
FIG. 2 is a block diagram for explaining an error recovery method in the distributed object sharing system of FIG. 1.
Figure 3:
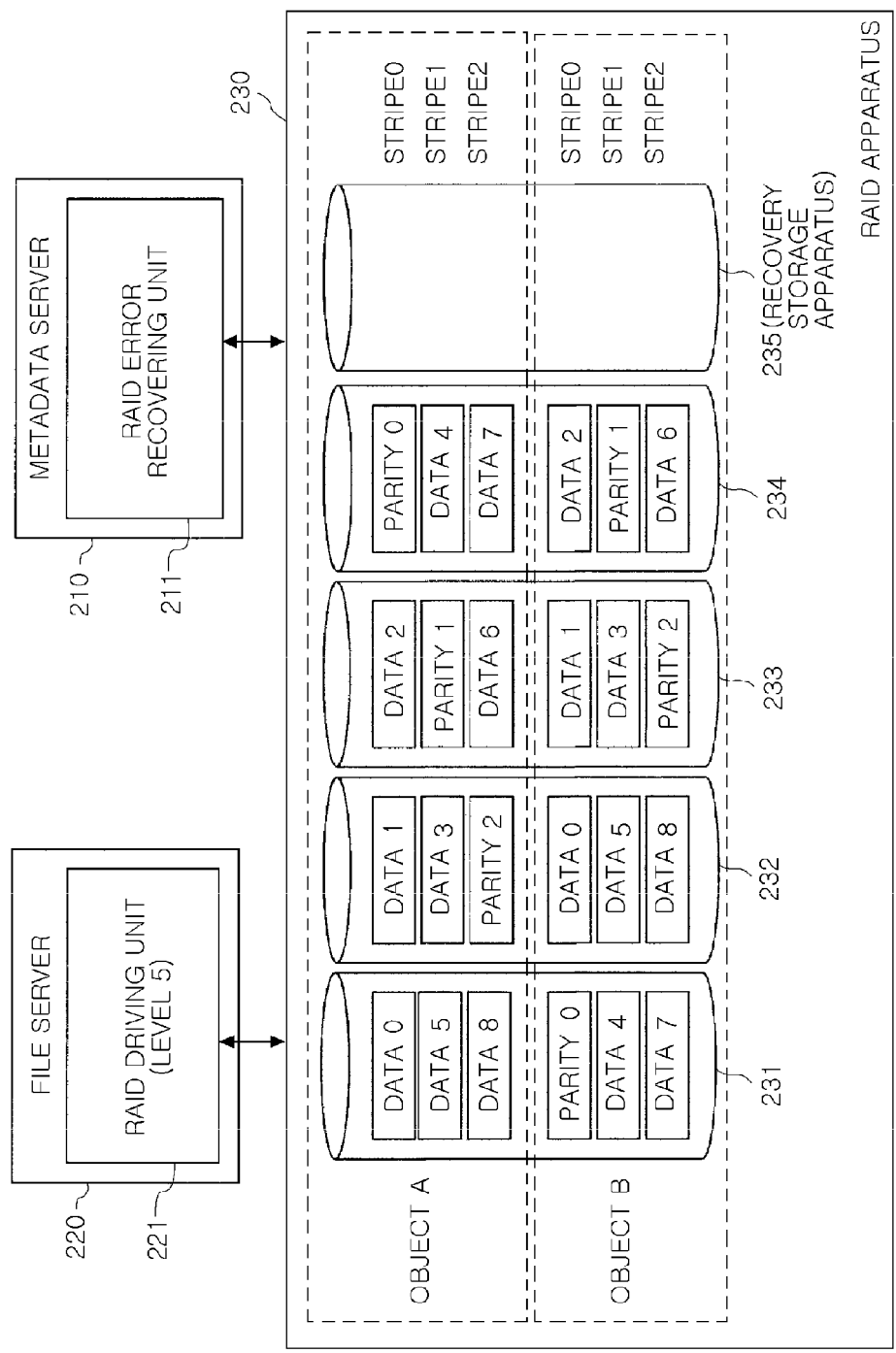
FIG. 3 is a block diagram illustrating a configuration of a conventional distributed object sharing system using a Level-5 RAID apparatus.
Figure 4:
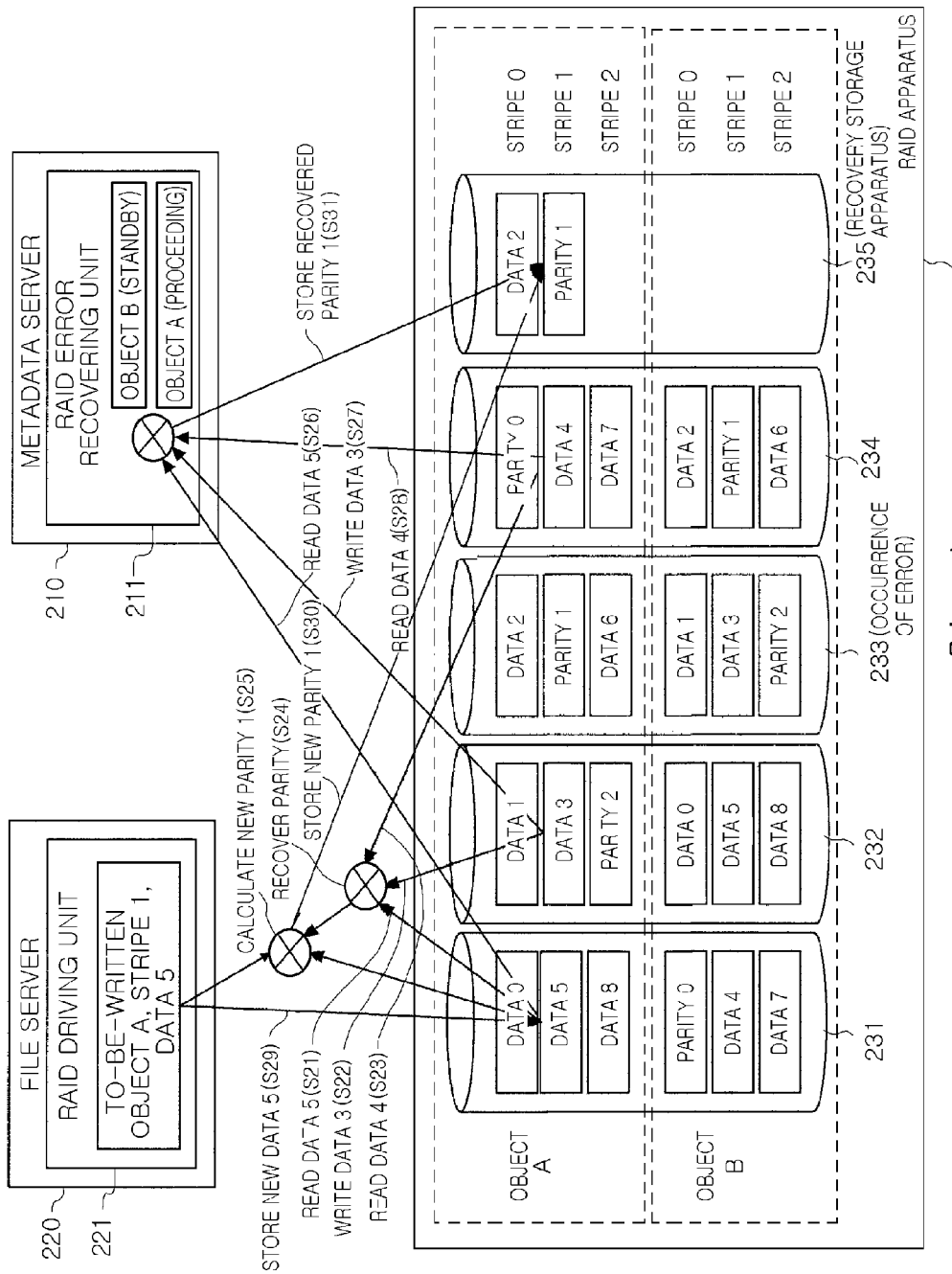
FIG. 4 is a block diagram for explaining an error recovery method in the distributed object sharing system of FIG. 3.

Hereinafter, exemplary embodiments of the present invention will now be described in detail with reference to the accompanying drawings. For clarifying of the present invention, description of well-known functions, structures, configuration, or constructions may be omitted.

In the accompanying drawings, like reference numerals denote like elements.

Figure 5:
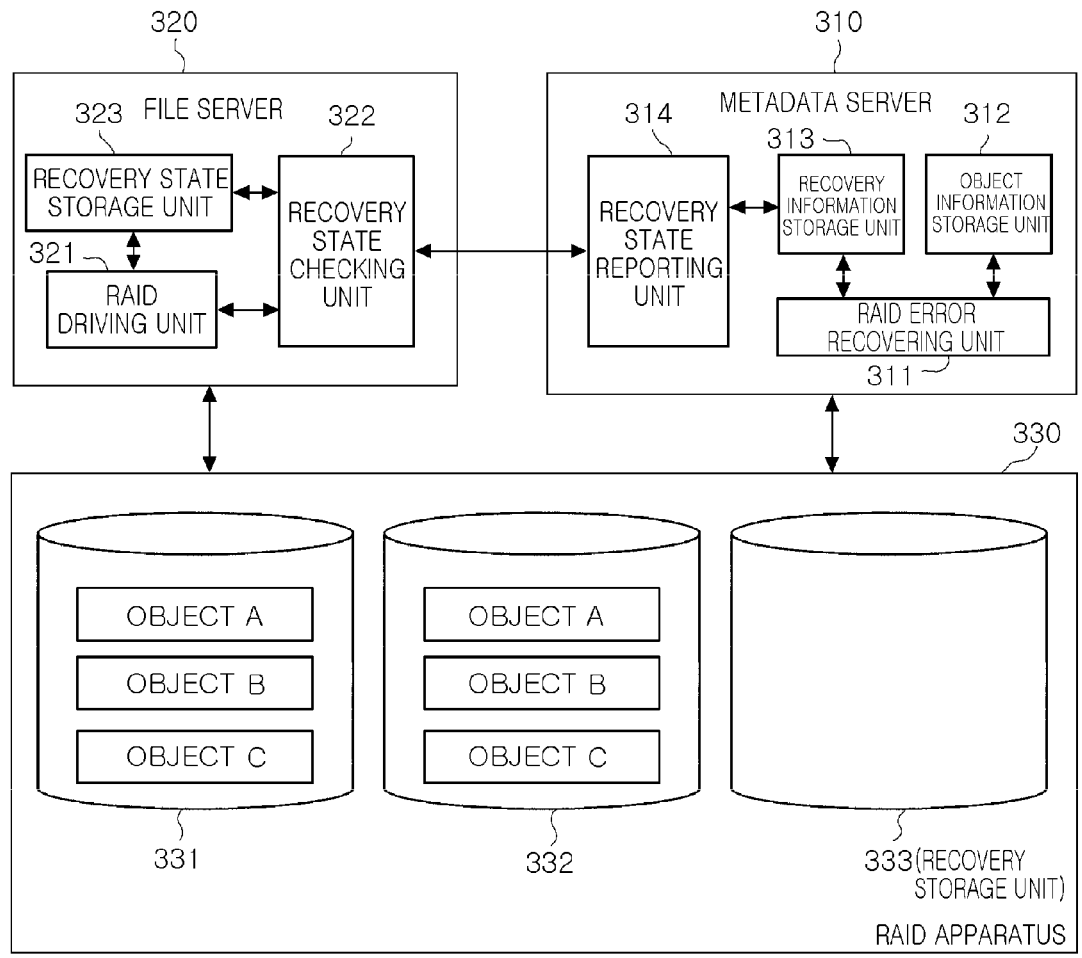
FIG. 5 is a block diagram illustrating a configuration of a distributed object sharing system using a RAID apparatus according to an embodiment of the present invention.

FIG. 5 is a block diagram illustrating a configuration of a distributed object sharing system using a RAID apparatus according to an embodiment of the present invention.

Referring to FIG. 5, the distributed object sharing system includes a metadata server 310, at least one file server 320, and a RAID apparatus 330.

The metadata server 310 includes a RAID error recovery unit 311, an object information storage unit 312, a recovery information storage unit 313, and a recovery state reporting unit 314.

When error occurs in an apparatus (for example, 331) of the RAID apparatus 310, the RAID error recovery unit 311 recovers an object stored in the RAID apparatus 310 to a recovery storage apparatus 333 and acquires recovery information.

The object information storage unit 312 stores object information of a plurality of objects and object list information of the RAID apparatus 310 so as to determine to-be-recovered objects and logic offsets thereof. The object list information includes the total number of objects stored in the RAID apparatus 310 and the last object identifier. The object information includes object identifiers and object sizes. The object information is arranged in the order of object identifiers.

The recovery information storage unit 313 stores recovery information representing a recovery state of the RAID error recovery unit 311. The recovery information includes a first identifier of a recovery-proceeding object and a first logic offset of a recovery-completed object.

When the file server 320 requests for the recovery state information, the recovery state reporting unit 314 determines a calculation mode according to an operation state of the file server 320. Next, the recovery state reporting unit 314 generates the recovery state information including the calculation mode and the recovery information and provides the recovery state information to the file server 320.

The file server 320 includes a RAID driving unit 321, a recovery state checking unit 322, and a recovery state storage unit 323.

When a writing or reading command is requested in occurrence of an erroneous storage apparatus, the RAID driving unit 321 executes the writing or reading command while checking the recovery state of the RAID apparatus based on the recovery state information.

The recovery state storage unit 323 stores the recovery state information provided from the metadata server 310.

Figure 6:
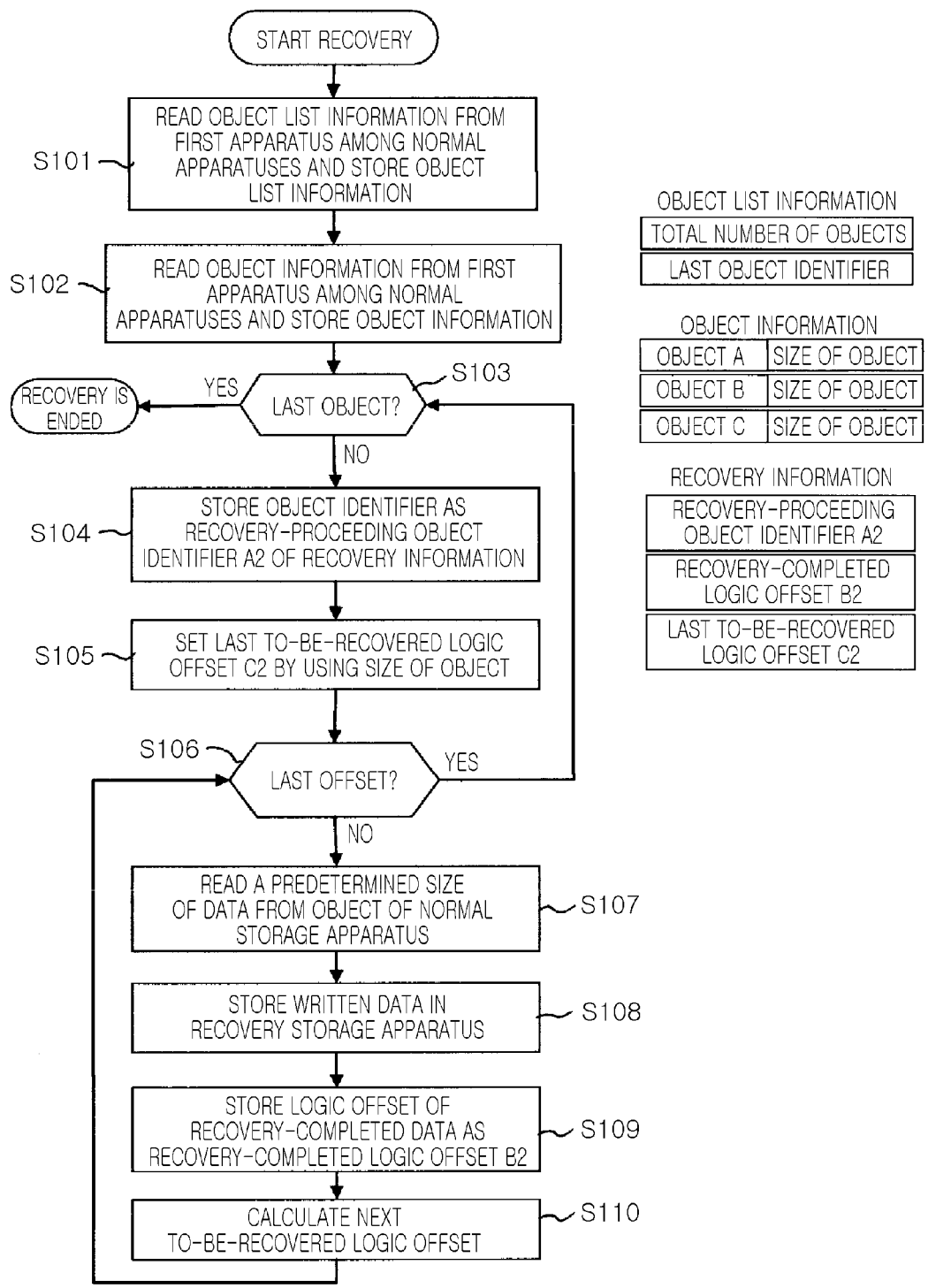
FIG. 6 is a flowchart for explaining an error recovery method in a metadata server according to the embodiment of the present invention.

FIG. 6 is a flowchart for explaining an error recovering method in a metadata server according to the embodiment of the present invention.

Firstly, object list information and object information of all the objects are read out from a first storage apparatus 323 among normal storage apparatuses and stored (S101 and S102) A recovered object is determined based on the object list information and the object information of all the objects and it is determined whether or not the recovered object is the last object (S103).

If the recovered object is the last object, it is determined that all the errors of the RAID apparatus 330 are recovered, and the operation is ended. If not, the identifier of the recovered object is acquired as a recovery-proceeding object identifier A1 of the recovery information and stored (S104). Next, the to-be-recovered logic offset C2 in the recovery information is acquired by using the size of the received object is stored (S105).

In case of Level-1 RAID apparatus, in step S104, the size of the recovered object is directly acquired as the last to-be-recovered logic offset C2. On the contrary, in case of Level-5 RAID apparatus, a value obtained by multiplying the size of the recovered object with the number of storage apparatuses is acquired as the last to-be-recovered logic offset C2 of the recovery information. This is because the size of the recovered object is the physical size of the object in the corresponding storage apparatus.

If the last to-be-recovered logic offset C2 acquired in the step s105 is the last offset of the first storage apparatus (S106), it is determined that the recovery of the object is completed, and the step s103 is performed again to select a newly to-be-recovered object. If not, a predetermined size of data is read out from a received object of a normal storage apparatus (S107). Next, the read data is stored in the recovery storage apparatus (S108).

The logic offset of the recovery-completed data is stored as a recovery-completed logic offset B2 (S109). A next to-be-recovered logic offset is calculated, and the step S106 is performed again. The recovery operation is repeated in units of a logic offset, so that all the objects are sequentially recovered (S110).

Figure 7:
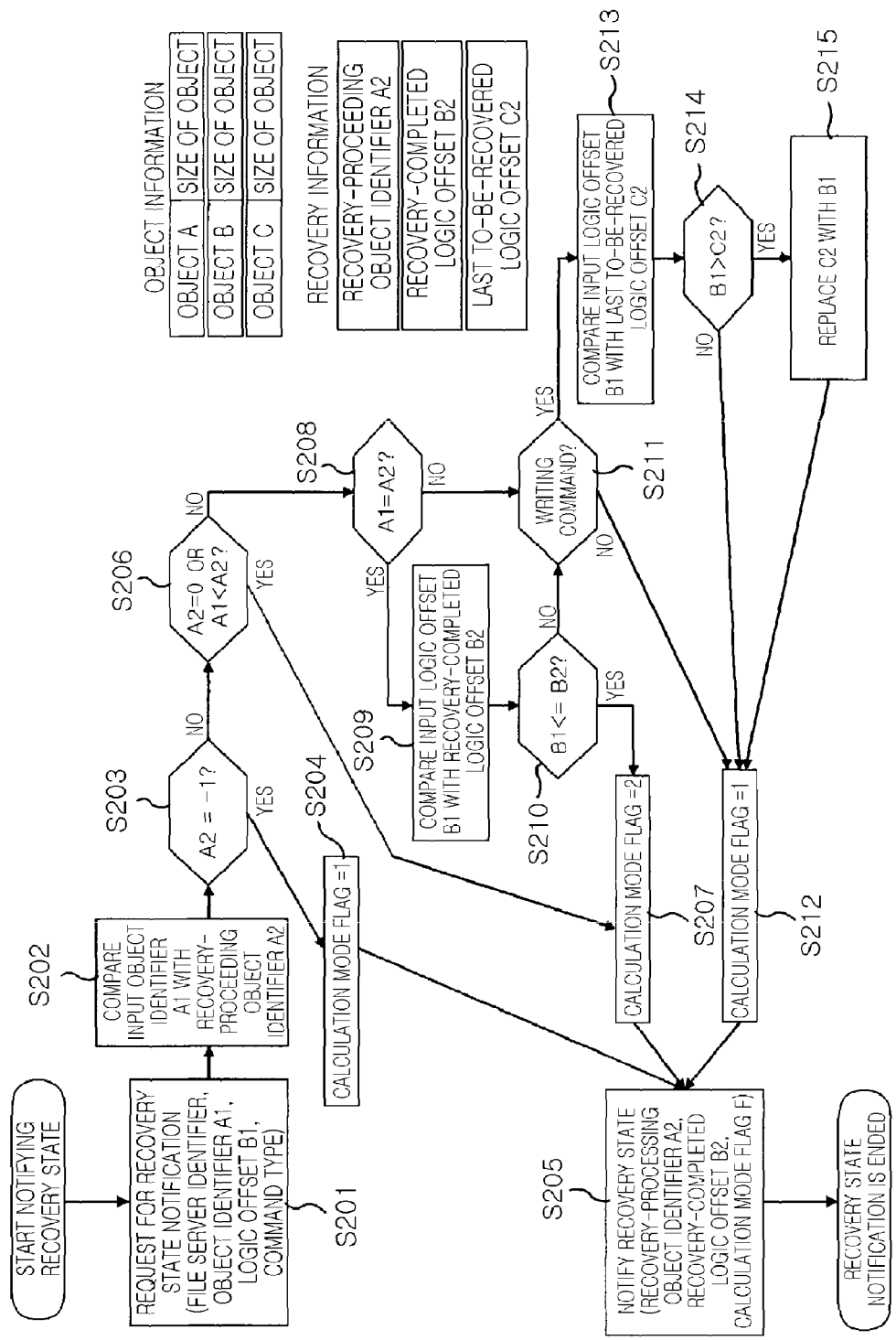
FIG. 7 is a flowchart for explaining a recovery state information providing method in the metadata server according to the embodiment of the present invention.

FIG. 7 is a flowchart for explaining a recovery state information providing method in the metadata server according to an embodiment of the present invention. The recovery state information providing method starts by a request of the file server 320.

When the file server 320 transmits a request message including a file server name, object identifier A1, a logic offset B1, and information of command type (S201), the object identifier A1 included in the request message is compared with a recovering-proceeding object identifier A2 in the recovery information (S202).

If the recovering-proceeding object identifier A2 has an initial value of −1 (S203), it is determined that the recovery of the associated object is not completed. A calculation mode flag value is set to 1, so that the corresponding command can be performed by the normal storage apparatuses (s204). Next, a response message including the flag value and the recovery information (recovering-proceeding object identifier A2 and a recovery-completed logic offset B2) is generated and transmitted to the file serve 320 (S205).

The flag of the calculation mode is determined the apparatuses that are to process the corresponding command. In the present invention, if the flag value is 1, the corresponding command is processed by using the normal storage apparatuses.

If the flag value is 2, the corresponding command is performed by using the recovery storage apparatus and the normal storage apparatuses.

If the recovering-proceeding object identifier A2 is 0, it is determined that the recovery of the RAID apparatus is completed. If the recovering-proceeding object identifier A2 is larger than the requested object identifier A1, it is determined that the recovery of the corresponding object is completed (S206).

Next, the calculation mode flag value is set to 2, so that the corresponding command can be performed by the recovery storage apparatus and normal storage apparatus (S207). Next, the step S205 is performed, so that the associated response message is generated and transmitted.

If the requested object identifier A1 is equal to the recovering-proceeding object identifier A2 (S208), it is determined that the requested object is a recovery-proceeding object. The recovery-completed logic offset B2 is compared with the logic offset B1 transmitted through the request message (209).

As a result of comparison, if the requested logic offset B1 is smaller than or equal to the recovery-completed logic offset B2 (S210), it is determined that the recovery of the requested object is completed, and the calculation mode flag value is set to 2 (S207). Next, a response message is generated and transmitted (S212).

On the contrary, if the requested object identifier A1 is larger than the recovering-proceeding object identifier A2 (S208), it is determined that the recovery of the requested object does not start. It is determined whether or not the command type of the request information is a writing command type (S211).

If the command type is not a writing command type, the calculation mode flag value is set to 1 so that the corresponding command is performed by using only the normal storage apparatus. Next, a response message is generated and transmitted (S212).

If the command type is a writing command type, the logic offset B1 is compared with the last to-be-recovered logic offset C2 (S213).

If the requested logic offset B1 is larger than the last to-be-recovered logic offset C2 (S214), it is determined that the writing command is a writing command for an offset which is larger than the object size determined by the metadata server 310. The value of the last to-be-recovered logic offset C2 is replaced with the requested logic offset B1 (S215). Next, the calculation mode flag value of 1 is generated and transmitted (S212 and S205).

This process is performed so as to prevent data loss caused from a command of changing an object size such as a writing command and an adding command.

Namely, although the file server 320 performs the command of changing the object size such as a writing command and an adding command, the metadata server 310 cannot recognize the change in the object size. Therefore, data loss may occur.

For this reason, in case of the writing command for an offset larger than the object size, the size of the to-be-recovered object is changed to be suitable for the offset. If the recovery of the object is completed, the wiring command for the recovery storage apparatus can be processed. Therefore, the data loss cannot occur.

Figure 8:
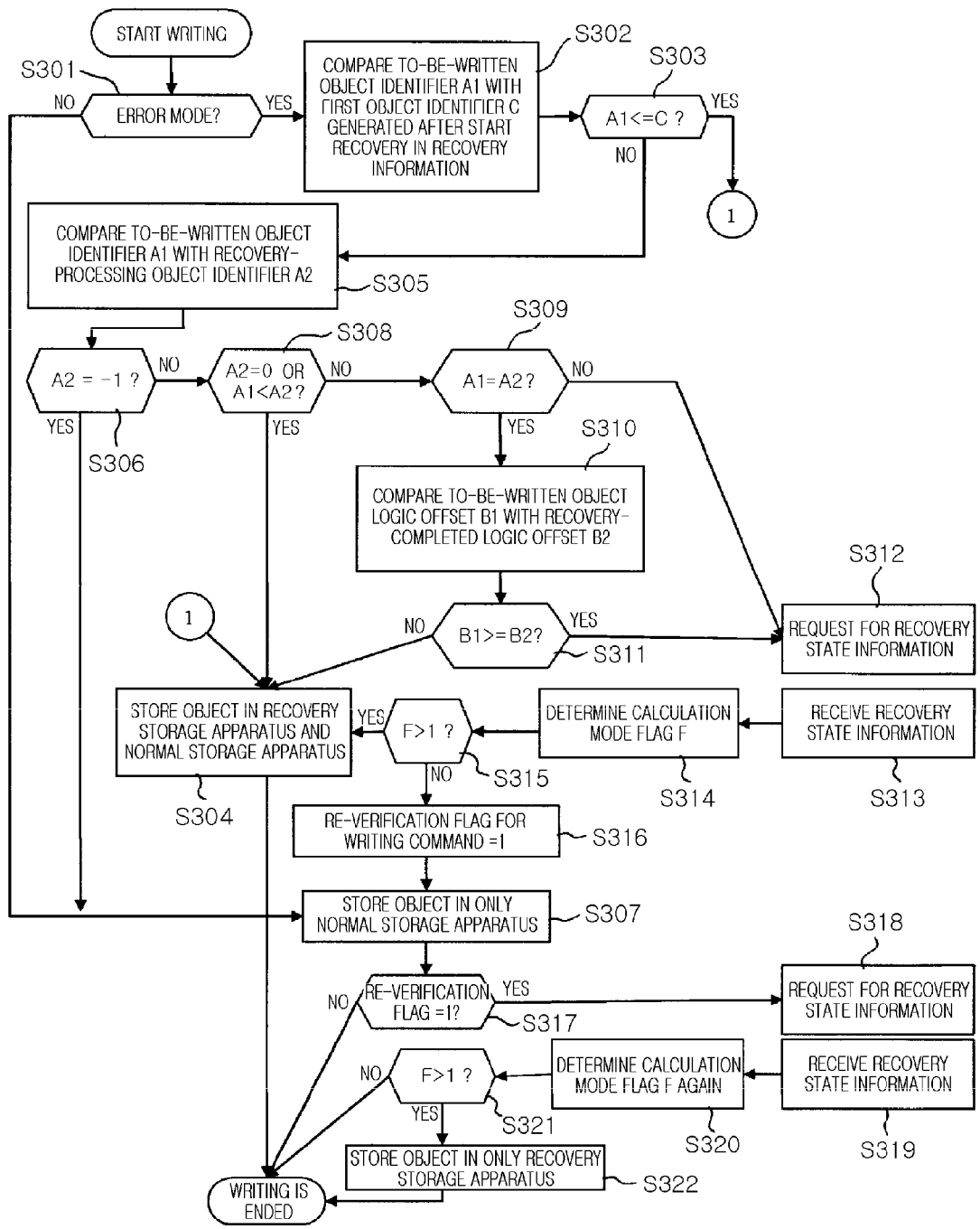
FIG. 8 is a flowchart for explaining a writing method in the file server according to the embodiment of the present invention.

FIG. 8 is a flowchart for explaining a writing method in the file server according to the embodiment of the present invention.

When the writing command is generated in occurrence of an error mode (S301), the file server determines that there is an object identifier C which is firstly generated after the start of the recovery in the recovery information stored in the file server. If a value of the object identifier C is larger than 0, a to-be-written object identifier A1 is compared with the object identifier C (S302).

The object identifier C is an identifier of an object which is firstly generated after the recovery of the metadata server 310 is enabled. The object identifier C denotes the first object that is directly generated from the recovery storage apparatus. Therefore, the objects that are generated after the generation of the object identifier C exist in the recovery storage apparatus, so that the writing command can be processed in the same manner as a normal mode.

If the to-be-written object identifier A1 is larger than or equal to the object identifier C (S303), the to-be-written object is determined to exist in the recovery storage apparatus and the normal storage apparatus, and the wiring operation is performed on the recovery storage apparatus and the normal storage apparatus (S304).

If the to-be-written object identifier A1 is smaller than the object identifier C (S303), the to-be-written object identifier A1 is compared with the recovery-proceeding object identifier A2) in the recovery information (S305).

If the recovery-proceeding object identifier A2 is an initial value of −1 (S306), it is determined that there is no recovery information transmitted from the metadata server 310 or that the recovery operation does not start. Therefore, the writing command is performed on only the normal storage apparatus (S307).

If the recovery-proceeding object identifier A2 is a recovery-completed value of 0, it is determined that the recovery of the erroneous storage apparatus of the metadata server 310 is completed. If the to-be-written object identifier A1 is smaller than the recovery-completed object identifier A2, it is determined that the recovery of the to-be-written object is completed (S308). After that, the wiring operation is performed on the recovery storage apparatus and the normal storage apparatus (S304).

If the to-be-written object identifier A1 is equal to the recovery-proceeding object identifier A2, it is determined that the recovery of the to-be-written object is proceeding (S309). Next, the to-be-written object logic offset B1 is compared with the recovery-completed logic offset B2 (S310).

If the to-be-written object logic offset B1 is smaller than or equal to the recovery-completed logic offset B2 (S311), it is determined that the recovery of data corresponding to the to-be-written object logic offset B1 is completed and stored in the recovery storage apparatus 333. Next, the writing operation is performed on all the storage apparatus 331 to 333 including the recovery storage apparatus 333 (S304).

If the to-be-written object logic offset B1 is larger than or equal to the recovery-completed logic offset B2 (S311), it is determined that the recovery of the data corresponding to the to-be-written object logic offset B1 is proceeding. In order to more accurately check the current recovery state, a request message is generated and transmitted to the metadata server 310 (S312).

The request message includes a file server name, a requested object identifier A1, a requested object logic offset B1, and a command type (for example, a writing command). The logic offset B1 is a value obtained by adding a data size to a start offset included in the writing command.

When the metadata server 310 transmits recovery state information including a calculation mode flag and a recovering-proceeding object identifier A2) and a recovery-completed logic offset B2 in the recovery information in response to the request message (S313), a value of the calculation mode flag is determined (S314).

If the value of the calculation mode flag is larger than 1 (S315), it is determined that the recovery of the data corresponding to the to-be-written object logic offset B1 is completed. The writing operation is performed on the all the storage apparatuses 331 to 333 including the recovery storage apparatus 333 (S304).

If the value of the calculation mode flag is smaller than 1 (S315), it is determined that the recovery of the data corresponding to the to-be-written object logic offset B1 is not completed. The writing command is performed on only the normal storage apparatuses (S307).

Next, a re-verification flag of the writing command is set to 1 (S316), and the writing command is performed on only the normal storage apparatuses (S307). Next, a value of the re-verification flag is determined (S317).

If the value of the re-verification flag is 1, the request message is transmitted to the metadata server 310 again (S318). A response message corresponding to the request message is received (S319).

Next, the recovery-completed object identifier B2, the recovery-completed object logic offset C2, and calculation mode flag are determined.

During the performing of the wiring command in the file server, if the value of the calculation mode flag is larger than 1 due to the completion of the recovery of the object in the metadata server 310 (S321), the same writing command is performed on the recovery storage apparatus 333 (S322).

This is because the data updated in the file server 320 may not be equal to the data stored in recovery storage apparatus 333. Therefore, this process is performed so as to prevent the data loss by storing the same data in the recovery storage apparatus 333.

Figure 9:
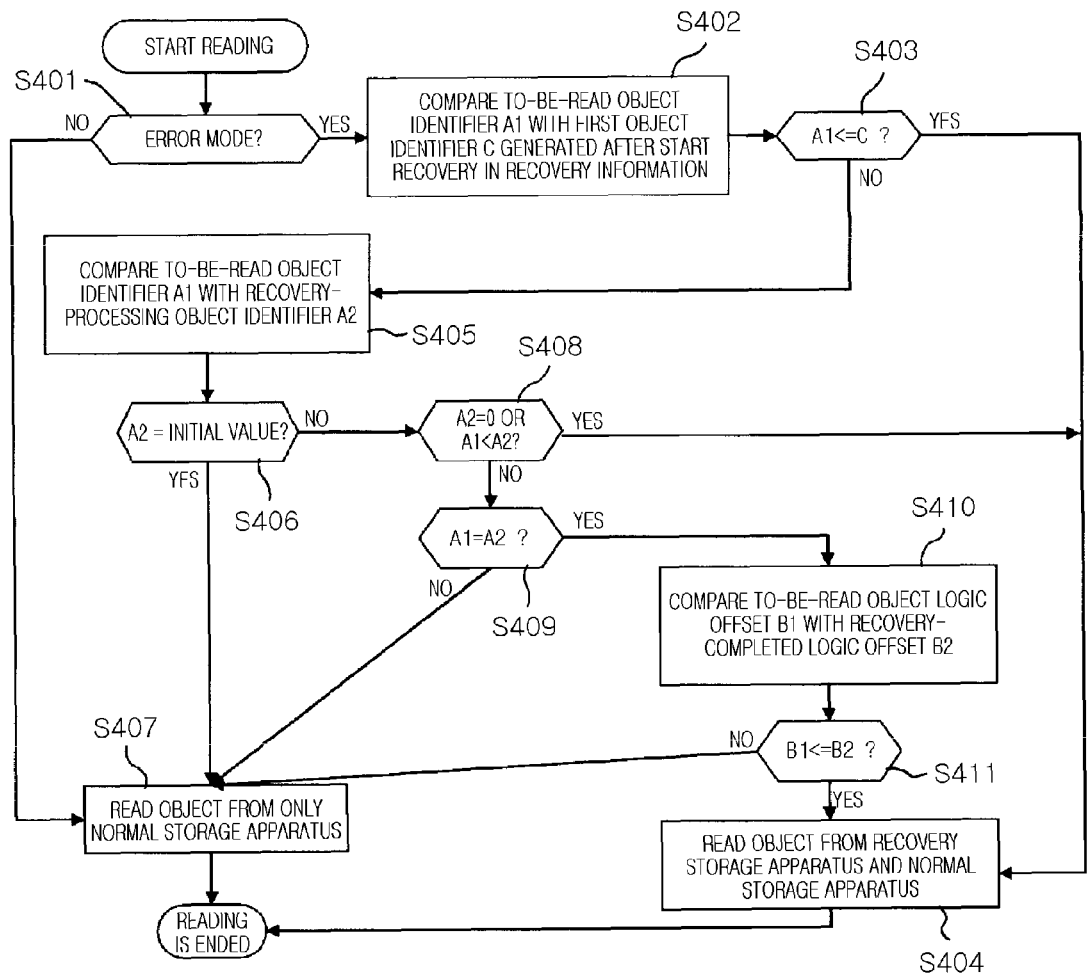
FIG. 9 is a flowchart for explaining a reading method in the file server according to the embodiment of the present invention.

FIG. 9 is a flowchart for explaining a reading method in the file server according to the embodiment of the present invention.

When the reading command is generated in occurrence of an error mode (S401), the file server determines that there is an object identifier C which is firstly generated after the start of the recovery in the recovery information stored in the file server. If a value of the object identifier C is larger than 0, a to-be-read object identifier A1 is compared with the object identifier C (S402).

If the to-be-read object identifier A1 is smaller than or equal to the object identifier C (S403), the to-be-read object is determined to exist in all the storage apparatuses 331 to 333 including the recovery storage apparatus 333. The reading command is performed on all the storage apparatuses 331 to 333 including the recovery storage apparatus 333 (S404).

If the to-be-read object identifier A1 is smaller than the object identifier C, it is determined that the objects are generated before the occurrence of the error. The requested object identifier A1 is compared with the recovery-completed object identifier A2 in the recovery information (S405).

If the recovery-proceeding object identifier A2 is an initial value of −1 (S406), it is determined that there is no recovery information transmitted from the metadata server 310 or that the recovery operation does not start. Therefore, the reading command is performed on only the normal storage apparatus (S407).

If the recovery-proceeding object identifier A2 is a recovery-completed value of 0, it is determined that the recovery of the metadata server 310 is completed. If the to-be-read object identifier A1 is smaller than the recovery-completed object identifier A2 (S408), it is determined that the recovery of the to-be-read object is completed. After that, the reading operation is performed on the all the storage apparatuses 331 to 333 including the recovery storage apparatus 333 (S404).

If the requested object identifier A1 is equal to the recovery-completed object identifier A2 (S409), it is determined that the recovery of the to-be-read object is proceeding, and the recovery is checked in units of an offset. Namely, the to-be-read object logic offset B1 is compared with the recovery-completed logic offset B2 (S410).

If the to-be-read object logic offset B1 is larger than the recovery-completed logic offset B2 (S411), it is determined that the recovery of the data corresponding to the to-be-read object logic offset B1 is completed and stored in the recovery storage apparatus 333. The reading operation is performed on the recovery storage apparatus and the normal storage apparatus (S404).

If the to-be-read object logic offset B1 is smaller than or equal to the recovery-completed logic offset B2 (S411), it is determined that the recovery of the data is not completed. The reading operation is performed on only the normal storage apparatus (S407).

According to the present invention, a separate recovery-state-information request operation is not performed in case of the reading operation. This is because the data loss does not occur in the reading operation. Therefore, the separate recovery-state-information request operation is not performed in order to reduce overhead which may be caused from reception and transmission of the recovery state information.

While the present invention has been shown and described in connection with the exemplary embodiments, it will be apparent to those skilled in the art that modifications and variations can be made without departing from the spirit and scope of the invention as defined by the appended claims.

What is claimed is:

1. A file server writing method of a file server for updating an object stored in a RAID (redundant array of inexpensive disks) apparatus having a plurality of storage apparatuses, which include a normal storage apparatus storing the object and a recovery storage apparatus, using a metadata server, the file server writing method comprising:
  upon receiving an object writing command to update the object, checking whether the RAID apparatus is in an error mode;
  writing the object to the normal storage apparatus if the RAID apparatus is not in the error mode; and
  if the RAID apparatus is in the error mode;
    obtaining a recovery state information from the metadata server, and checking a recovery state of the object contained in the recovery state information to determine whether the recovery of the object is completed;
    if the recovery of the object is completed, performing the object writing command on the normal storage apparatus and the recovery storage apparatus; and
    if the recovery of the object is proceeding:
      receiving the recovery state information from the metadata server again, and checking the recovery state of the object again to determine whether or not the recovery of the object is completed and the object can be written to the normal storage apparatus;
      if the recovery of the object is completed, performing the object writing command on the normal storage apparatus and the recovery storage apparatus; and
      if the recovery of the object is not completed, performing the object writing command on only the normal storage apparatus, and repeatedly receiving the recovery state information from the metadata server again and checking the recovery state of the object in the received recovery state information, and, if the recovery of the object is completed, additionally performing the object writing command on the recovery storage apparatus.

2. The file server writing method of claim 1, wherein the recovery state information includes a calculation mode flag, a first identifier of a recovery-proceeding object, and a first logic offset of a recovery-completed object used to determine storage apparatuses on which the object writing command is to be performed.

3. The file server writing method of claim 2, wherein the checking the recovery state of the object comprises:
  determining that the recovery of the object is completed when the first identifier is a recovery-completed value and when an identifier of the object is smaller than or equal to the first identifier firstly generated after the start of the recovery;
  determining that the recovery of the object is completed when the identifier of the object is smaller than the first identifier;
  determining that the recovery of the object is proceeding when the identifier of the object is equal to the first identifier;
  determining that the recovery of the object is completed up to an object data corresponding to a logic offset when the identifier of the object is equal to the first identifier and when the logic offset corresponding to the object data is smaller than a first logic offset; and
  determining that the recovery of the object does not start when the first identifier is an initial value.

4. The file server writing method of claim 2, wherein the calculation mode flag comprise:
  a first value allowing the object writing command to be performed on only the normal storage apparatus; and
  a second value allowing the object writing command to be performed on the normal storage apparatus and the recovery storage apparatus.

5. The file server writing method of claim 4, further comprising, if the recovery of the object is proceeding:
  performing the object writing command on the normal storage apparatus and the recovery storage apparatus, when the calculation mode flag of the recovery state information is the second value, and,
  activating a re-verification flag, when the calculation mode flag of the recovery state information is the first value.

6. The file server writing method of claim 5, wherein the receiving the recovery state information comprises:
  transmitting a request message including an identifier of the file server, the identifier of the object, the logic offset of the object data, and a command type to the metadata server; and
  receiving a response message including the recovery state information from the metadata server.

7. The file server writing method of claim 5, further comprising, if the recovery of the object is not completed, and when the re-verification flag is activated, performing the writing command on only the normal storage apparatus, and receiving the recovery state information from the metadata server again.

8. The file server writing method of claim 7, wherein the checking the recovery state of the object further includes:
  when the calculation mode flag of the received recovery state information is the second value, additionally performing the object writing command on the recovery storage apparatus; and
  when the calculation mode flag of the recovery state information is the first value, determining that the recovery of the object is proceeding.

9. A file server reading method of a file server for reading an object stored in a RAID (redundant array of independent disks) apparatus having a plurality of storage apparatuses, which include a normal storage apparatus storing the object and a recovery storage apparatus, using a metadata server, the file server reading method comprising:

upon receiving an object reading command to read the object, checking whether the RAID apparatus is in an error mode;

read the object from the normal storage apparatus if the RAID apparatus is not in the error mode; and if the RAID apparatus is in the error mode:
obtaining a recovery state information from the metadata server, and checking a recovery state of the object contained in the recovery state information;
if the recovery of the object is completed, performing the object reading command on the normal storage apparatus and the recovery storage apparatus;
if the recovery of the object is proceeding or does not start, performing the object reading command on only the normal storage apparatus.

10. The file server reading method of claim 9, wherein the recovery state information includes a calculation mode flag, a first identifier of a recovery-proceeding object, and a first logic offset of a recovery-completed object used to determine storage apparatuses on which the object reading command is to be performed.

11. The file server reading method of claim 10, wherein the checking the recovery state of the object comprises:
determining that the recovery of the object is completed when the first identifier is a recovery-completed value and when an identifier of the object is smaller than or equal to the first identifier firstly generated after the start of the recovery;
determining that the recovery of the object is completed when the identifier of the object is smaller than the first identifier;
determining that the recovery of the object is proceeding when the identifier of the object is equal to the first identifier;
determining that the recovery of the object is completed up to an object data corresponding to a logic offset when the identifier of the object is equal to the first identifier and when the logic offset corresponding to the object data is smaller than a first logic offset; and
determining that the recovery of the object is not completed when the first identifier is an initial value.

12. A metadata server error-recovering method for recovering an error of a RAID apparatus having a plurality of storage apparatuses including a recovery storage device, the metadata server error-recovering method comprising:
(a) upon detecting an erroneous storage apparatus from the plurality of storage apparatuses, determining a to-be-recovered object, reading the object from a normal storage apparatus of the plurality of storage apparatuses, storing the object in the recovery storage apparatus, and acquiring recovery information; and
(b) upon receiving a recovery state information request from a file server, determining a calculation mode according to an operation state of the file server and providing the calculation mode and the recovery information to the file server.

13. The metadata server error-recovering method of claim 12, wherein step (a) further includes, upon detecting an erroneous storage apparatus from the plurality of storage apparatuses,
reading object list information and object information from the normal storage apparatus and storing the object list information and the object information;
determining the to-be-recovered object with reference to the object information and acquiring an identifier of a recovery-proceeding-object and a last to-be-recovered logic offset corresponding to the to-be-recovered object;
reading the to-be-recovered object in units of a logic offset from the normal storage apparatus, storing the to-be-recovered object in the recovery storage apparatus, and acquiring the logic offset of the to-be-recovered object stored in the recovery storage apparatus as a recovery-completed logic offset; and
generating the recovery information including the identifier of the recovery-proceeding object, the last to-be-recovered logic offset, and the recovery-completed logic offset.

14. The metadata server error-recovering method of claim 13, wherein the acquiring the identifier of the recovery-proceeding object and the last to-be-recovered logic offset comprises:
acquiring a size of the to-be-recovered object as the last to-be-recovered logic offset for a Level-1 RAID apparatus; and
acquiring a product of the size of the to-be-recovered object and the number of storage apparatuses included in the RAID apparatus as the last to-be-recovered logic offset for a Level-5 RAID apparatus.

15. The metadata server error-recovering method of claim 12, wherein step (b) further includes:
receiving a request message including an identifier of the file server, the identifier of the object, the logic offset of the object data, and a command type from the file server;
when the identifier of the recovery-proceeding object is an initial value, setting the calculation mode to a first state;
when the identifier of the recovery-proceeding object is not generated or when the identifier of the recovery-proceeding object is larger than the identifier of the object, setting the calculation mode to a second state;
when the identifier of the recovery-proceeding object is smaller than or equal to the identifier of the object and when the logic offset of the object data is larger than the recovery-completed logic offsets, setting the calculation mode to the second state;
when the identifier of the recovery-proceeding object is larger than the identifier of the object and when the command type is not a writing command, setting the calculation mode to the first state;
when the command type is the writing command and when the logic offset of the object data is larger than the last to-be-recovered logic offset, setting the calculation mode to the first state; and
generating a response message including the calculation mode, the identifier of the recovery-proceeding object, the recovery-completed logic offset, and the last to-be-recovered logic offset and transmitting the response message to the file server.

16. The metadata server error-recovering method of claim 12, wherein step (b) further includes:
when the command type is a writing command and when the logic offset of the object data is smaller than or equal to the last to-be-recovered logic offset, replacing the last to-be-recovered logic offset with the logic offset of the object data; and
generating a response message including the calculation mode, the identifier of the recovery-proceeding object, the recovery-completed logic offset, and the last to-be-recovered logic offset and transmitting the response message to the file server.

17. A file server for storing an object in a RAID apparatus having a plurality of storage apparatuses using a metadata server, the file server comprising:

a recovery state checking unit requesting and receiving a recovery state information from the metadata server;

a recovery state storage unit storing the recovery state information; and a RAID driving unit configured to perform a writing or reading command on a normal storage apparatus of the plurality of storage apparatuses and the recovery storage apparatus when an analysis of the recovery state information indicates that a recovery of the object is completed, and to perform the writing or reading command on only the normal storage apparatus when the analysis of the recovery state information indicates that the recovery of the object does not start, if the writing or reading command is requested when the plurality of storage apparatuses are in an error mode.

18. The file server of claim 17, wherein the RAID driving unit is further configured to perform the writing command on the normal storage apparatus, to receive the recovery state information from the metadata server again to determine whether or not the recovery of the object is completed, and to determine whether or not to perform the writing command on the recovery storage apparatus, if the analysis of the recovery state information indicates that the recovery of the object is proceeding.

19. The file server of claim 17, wherein the recovery state information includes a calculation mode flag, a first identifier of a recovery-proceeding object, and a first logic offset of a recovery-completed object used to determine storage apparatuses on which the command is to be performed.

20. A metadata server for recovering an error of a RAID apparatus having a plurality of storage apparatuses, the metadata server comprising:

a RAID error recovery unit configured to acquire recovery information while recovering an object stored in the RAID apparatus to a recovery storage apparatus, when the RAID apparatus is in an error mode;

a recovery information storage unit storing the recovery information; and a recovery state reporting unit configured to, upon receiving a recovery state information request from a file server, to determine a calculation mode according to an operation state of the file server, to generate the recovery state information including the calculation mode and the recovery information, and to provide the recovery state information to the file server.

21. The metadata server of claim 20, wherein the recovery state reporting unit analyzes a request message including an identifier of the file server, an identifier of the object, a logic offset of an object data, and a command type from the file server, sets the calculation mode flag to determine the storage apparatuses on which the command is performed, and provides the calculation mode flag and the recovery information to the file server.

22. The metadata server of claim 20, wherein the recovery information includes a first identifier of a recovery-proceeding object and a first logic offset of a recovery-completed object.

* * * * *